350-3.83 SR 1 3037 W

OR 3,582,176 X 3052 H (2)

United States Patent

[11] 3,582,176

[72] Inventor Einar S. Mathisen
Poughkeepsie, N.Y.

[21] Appl. No 786,902
[22] Filed Dec. 26, 1968
[45] Patented June 1, 1971
[73] Assignee International Business Machines Corporation
Armonk, N.Y.

[54] HOLOGRAPHIC OPTICAL METHOD AND SYSTEM FOR PHOTOPRINTING THREE-DIMENSIONAL PATTERNS ON THREE-DIMENSIONAL OBJECTS
4 Claims, 5 Drawing Figs.

[52] U.S. Cl. 350/3.5, 96/27, 96/36.2
[51] Int. Cl. G02b 27/22
[50] Field of Search 350/3.5; 96/36, 36.2, 27 H

[56] References Cited

OTHER REFERENCES

Jeong et al., Jour. of the Optical Soc. of Am., Vol. 56, No. 9, pp. 1263— 1264, Sept. 1966

Jeong, Jour. of the Optical Soc. of Am., Vol. 57, No. 9, pp. 1396— 1398, Sept. 1967

Grobin et al., IBM Tech. Disclosure Bulletin, Vol. 10, No. 3, pp. 282— 283, Aug. 1967

*Primary Examiner*—David Schonberg
*Assistant Examiner*—Ronald J. Stern
*Attorneys*—Hanifin and Jancin and Robert J. Haase

ABSTRACT: Optical apparatus is disclosed for simultaneously illuminating every accessible (i.e., exposed-to-view) surface of a three-dimensional object with monochromatic spatially coherent light. The light reflected from the object is collected and directed on a photosensitive film which also receives a reference beam of monochromatic spatially coherent light of the same frequency as the illuminating beam. The photographic hologram resulting from the development of the film is illuminated by a beam which is the conjugate of said reference beam to produce a real image of the original object. A suitably photosensitized duplicate object, placed at the position of the original object is exposed to the real image whereby every corresponding accessible surface of the duplicate object simultaneously is exposed to the real image.

INVENTOR
EINAR S. MATHISEN
BY Robert J. Haase
ATTORNEY

HOLOGRAPHIC OPTICAL METHOD AND SYSTEM FOR PHOTOPRINTING THREE-DIMENSIONAL PATTERNS ON THREE-DIMENSIONAL OBJECTS

BACKGROUND OF THE INVENTION

The invention generally relates to the photomasking or photoprinting of a three-dimensional pattern on a three-dimensional object utilizing holographic techniques. More particularly, the invention concerns a method and apparatus for simultaneously exposing every accessible surface of a photosensitized duplicate object to the holographically produced three-dimensional real image of a three-dimensional master object.

Techniques are well-known for photographically recording various image data respecting master objects and for utilizing the recorded data in the production of duplicate objects. For example, in the printed-circuit art, photographic masks are produced from a master printed-circuit pattern and then used to selectively expose photosensitized circuit boards so as to produce duplicate printed-circuit patterns. In addition, image data has been recorded in the form of holograms which, in turn, have been used to reconstruct three-dimensional virtual images and two-dimensional real images of the object utilized in the construction of the hologram.

In the rapid developing technologies of multilayered printed-circuit wiring boards in which different circuits are formed on the opposite board surfaces and interconnected at desired points by conductors which penetrate through the board and in other related arts such as the production of wound miniature ferrite cores, a need has arisen for improved means for mass producing three-dimensional objects having desired three-dimensional patterns on all of the accessible (i.e., exposed-to-view) surfaces. The prior art photographic techniques and the essentially two-dimension holographic techniques mentioned above are not satisfactorily suited to the mass production of complete three-dimensional objects.

SUMMARY OF THE INVENTION

In accordance with the present invention, a method and apparatus are provided for constructing a hologram of every accessible surface of a three-dimensional master object and for reconstructing a three-dimensional real image from the hologram. The reconstructed real image is directed upon a duplicate object placed at the position of the master object from which the hologram was made. The duplicate object is suitably photosensitized and exposed to the real image whereby all of the accessible surfaces of the duplicate object simultaneously are exposed in accordance with the pattern on the corresponding surfaces of the master object. Preferably, a single flat hologram or a plurality of flat holograms is derived from monochromatic spatially coherent light reflected from every accessible surface of the master object. The use of flat rather than curved holograms greatly facilitates the removal and the reinsertion of the photosensitive material from which the hologram is made to permit the development of the exposed sensitized material. After development of the exposed sensitized material, the resulting hologram of the desired three-dimensional pattern must be reinserted accurately in the optical system to reconstruct the real image at precisely the location occupied first by the master object and then by the duplicate object.

DESCRIPTION OF THE PREFERRED EMBODIMENTS

Figure 1:
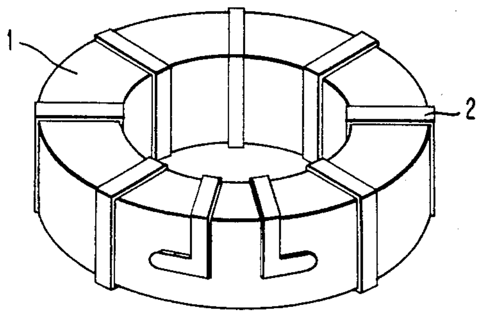
FIG. 1 is a simplified sketch in perspective of a wound ferrite core which is a typical master object utilized in the present invention.

FIG. 1 represents a ferrite toroid transformer core 1 having a winding 2 of a conductive material such as copper. Winding 2 can be formed on core 1 by a subtractive fabrication technique, for example, in which the core 1 is first completely covered with a conductive material such as copper and then the copper is selectively etched away in nonwinding areas to yield the desired winding pattern. A prerequisite to the selective etching of the undesired copper is the formation of exposed photoresist material about the core 1 in the desired pattern of winding 2. In accordance with the present invention, a conventional photoresist process is used in combination with a unique optical system for simultaneously exposing all of the photoresist-clad surfaces of the toroid in the desired three-dimensional pattern of winding 2. The holographic technique by which the desired exposure is accomplished can be understood with the aid of FIG. 2.

Figure 2:
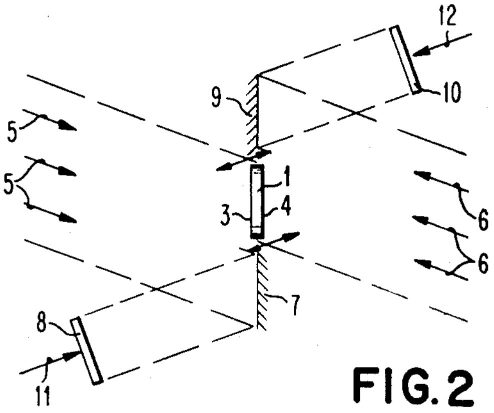
FIG. 2 is a simplified schematic sketch of an optical system for constructing plural holograms in accordance with the present invention and for reconstructing from the holograms a single three-dimensional real image.

In FIG. 2, core 1 is simultaneously illuminated at opposite surfaces 3 and 4 by beams 5 and 6 of monochromatic spatially coherent light preferably derived from a single laser source (not shown). Mirror 7 which is placed adjacent one end of core 1 intercepts a portion of beam 5 and directs the intercepted portion as a reference beam to flat photosensitive member 8. Similarly, mirror 9 placed adjacent the other end of core 1 intercepts a portion of beam 6 and directs the intercepted portion as a reference beam to flat photosensitive member 10. The other portion of beam 5 is reflected by core 1 in the direction of photosensitive member 8 to produce an interference pattern or hologram representing the pattern on the side of core 1 viewed by member 8. Similarly, the other portion of beam 6 reflected by object 1 and the portion of beam 6 reflected by mirror 9 expose photosensitive member 10 in accordance with a hologram resulting from the interference between the two reflected portions of beam 6. The hologram exposed on member 10 represents the pattern on core 1 viewed by member 10.

The real image of the pattern of core 1 viewed by mirror 8 is reconstructed by directing monochromatic spatially coherent light beam 11 (conjugate of reflected beam 5) on member 8 after it has been developed to form the hologram. Similarly, the real image of the pattern within the view of member 10 can be reconstructed by directing monochromatic spatially coherent beam 12 (conjugate of reflected beam 6) on member 10 after it has been suitably developed to yield the respective hologram. When a photographically sensitized duplicate core is substituted at precisely the location of master core 1, all of the surfaces of the duplicate core are simultaneously exposed in accordance with the three-dimensional pattern of the winding 2 on master core 1.

The contrast between the exposed and the unexposed areas of the duplicate core can be enhanced for strong winding-pattern definition by appropriate fabrication of master core 1. For example, master core 1 could be made of a material other than ferrite selected for minimum reflection of the illuminating beams 5 and 6 whereas the winding pattern is made of a material other than copper providing maximum reflection. Thus, in its most general application, the present invention does not necessarily contemplate a master object which is made of the same materials as the desired duplicate objects resulting therefrom.

Figure 3:
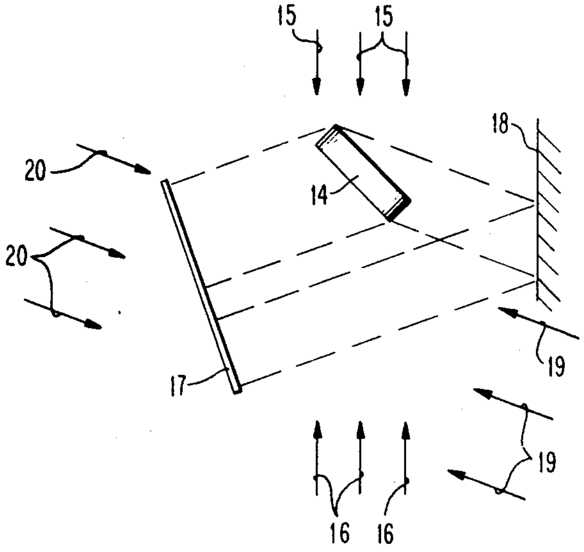
FIG. 3 is a simplified schematic sketch of an alternative embodiment of the invention in which a three-dimensional real image is reconstructed from a single hologram.

In the alternative embodiment of FIG. 3, a single flat hologram is formed from the light reflected from all of the surfaces of core 14. All of the surfaces of core 14 are simultaneously illuminated by beams 15 and 16 of monochromatic spatially coherent light derived from a common source (not shown).

Light from beams 15 and 16 which is directly reflected by core 14 as well as by the light which is indirectly reflected by core 14 (via mirror 18). Material 17 also is exposed to reference beam 19 of monochromatic spatially coherent light having the same frequency as beams 15 and 16. The reflected beams and the reference beam produce a hologram after development of material 17 representing the three-dimensional pattern on the surfaces of core 14. The three-dimensional real image of said pattern is reconstructed by illuminating the hologram on member 17 with beam 20 (conjugate of beam 19) in the absence of beams 15 and 16. A real image is formed at the position of core 14. A duplicate core which is completely covered with a photosensitive material then is substituted for core 14 precisely in the position occupied by core 14 and is exposed to the reconstructed three-dimensional real image of core 14. Thus, the pattern of the winding on core 14 is simultaneously transferred in its entirety to the duplicate core.

It will be noted that it is generally necessary to remove photosensitive material 17 after exposure to the hologram pattern in order to develop the exposed photosensitive material. After development, material 17 is reinserted (with its hologram) precisely in the position it assumed when the hologram exposure was made. The flat shape of member 17 greatly facilitates its accurate relocation within the optical system.

Figure 4:
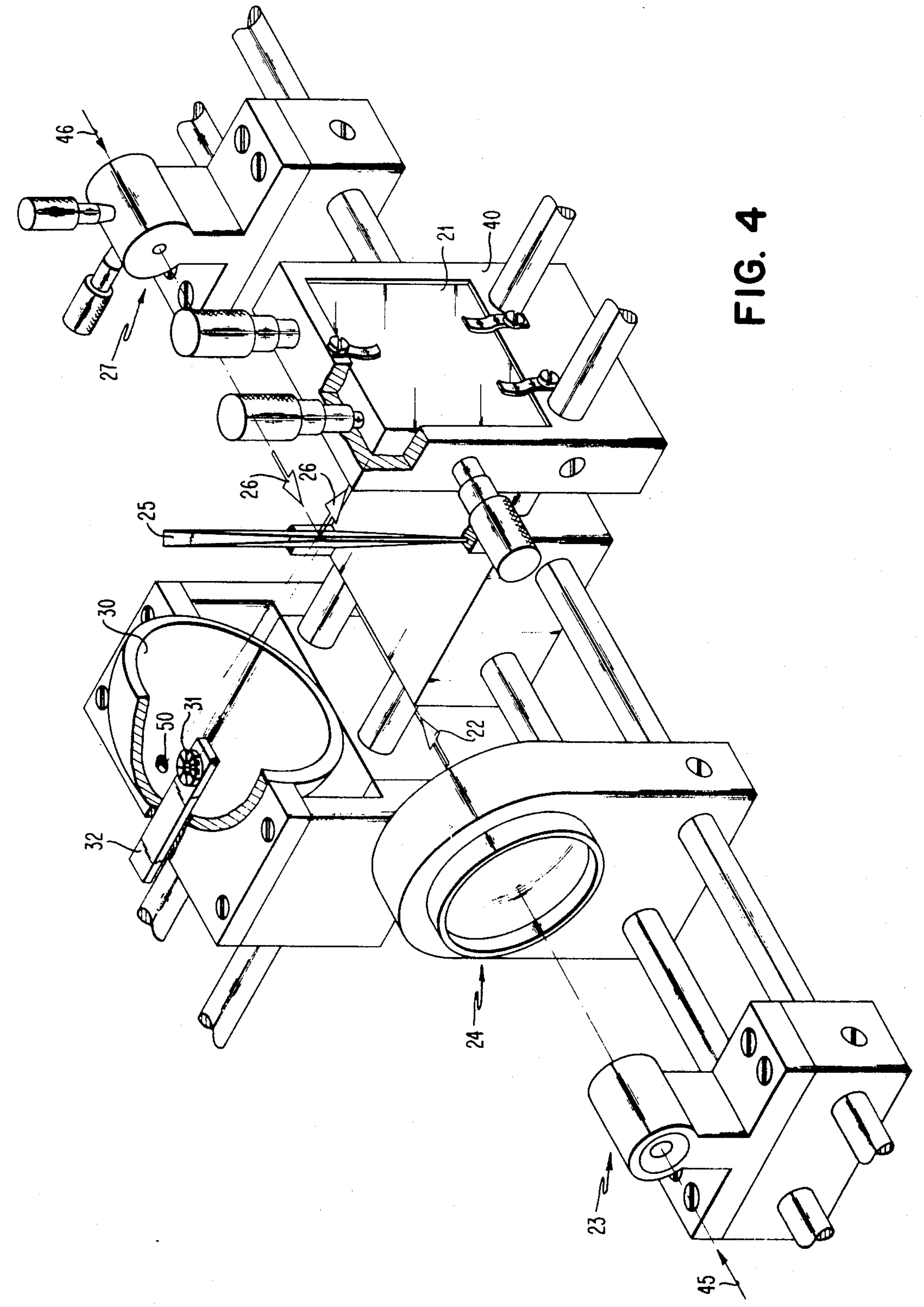
FIG. 4 is a simplified sketch of a preferred embodiment of the invention for constructing a single hologram representing every accessible surface of a three-dimensional object.

The preferred embodiment of the present invention shown in FIG. 4 eliminates the use of the pair of holograms 8 and 10 used in the embodiment of FIG. 2 and the pair of object beams 15 and 16 utilized in the embodiment of FIG. 3. Only one hologram 21 and one object beam 22 are utilized in the embodiment of FIG. 4. The object beam 22 is formed from collimated beam 45 by lenses 23 and 24 and is directed onto core 31 by beam splitter 25 and mirror 30. The light reflected by core 31 passes through beam splitter 25 and falls on film 21. A collimated reference beam 26 is formed from collimated beam 46 by lens 27 and is directed by beam splitter 25 onto film 21.

Mirror 30 redirects the object beam from beam splitter 25 onto the upper, lower and side surfaces of toroid 31 as well as into the aperture of the toroid. Toroid holder 32 consists of a transparent material which is substantially nonreflecting and nonabsorbing at the frequency of object beam 22. The object beam light which is reflected simultaneously from all the surfaces of toroid 31 is redirected by mirror 30 through beam splitter 25 and onto film 21 along with the reference beam 26. The resulting interference between the two beams produces a hologram on film 21 after it has been developed. Film 21 is positioned in holder 40 which is arranged to permit the removal of the film for development purposes and to permit the reinsertion of the developed film at exactly the same position it occupied during the exposure.

Figure 5:
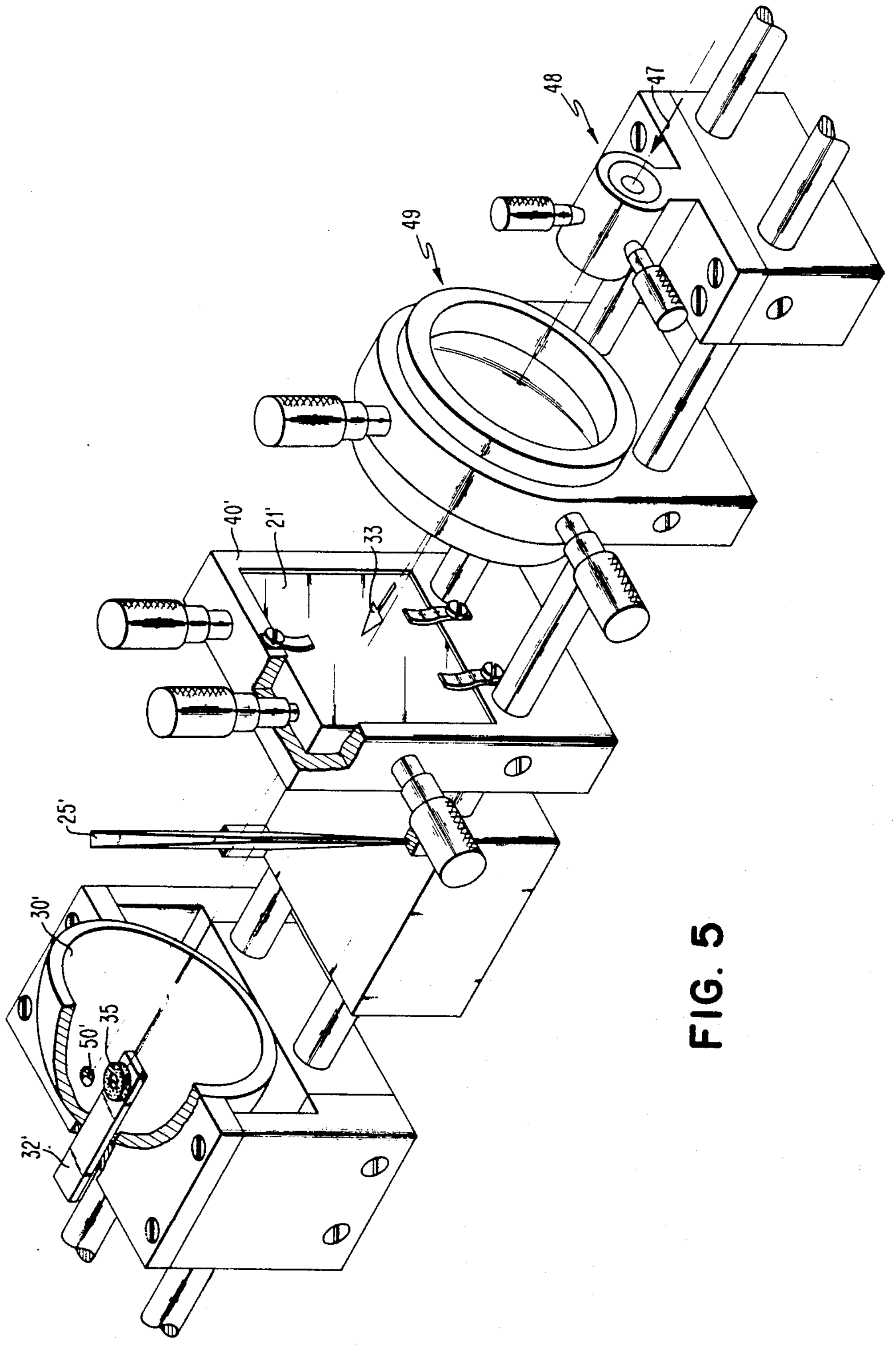
FIG. 5 is a simplified sketch of apparatus for reconstructing a three-dimensional real image using the hologram from FIG. 4.

With the hologram film 21' in position and a duplicate photosensitized core 35 substituted in holder 32' as shown in FIG. 5, the entire real image of the original core is projected simultaneously upon all of the surfaces of the duplicate core by illuminating the hologram film 21' with light beam 33. Light beam 33 is formed from collimated beam 47 by lenses 48 and 49 to be the conjugate of reference beam 26 of FIG. 4. The object, reference and conjugate beams are preferably derived from the same collimated spatially coherent light source. The object and the reference beams are not used during the exposure of photosensitized duplicate core 35. The light from conjugate beam 33 which is transmitted by hologram film 21' passes through beam splitter 25' of FIG. 5 and is redirected by mirror 30' onto all of the surfaces of duplicate core 35. As in the case of the real image reconstruction discussed in connection with FIGS. 2 and 3, the desired winding pattern on the original core 31 of FIG. 4 is transferred in its entirety at one time onto duplicate core 35 of FIG. 5.

It will be observed that aperture 50' is placed in mirror 30' to permit the exit of the DC term of the modulated conjugate light beam. Beam 47 and lenses 48 and 49 which produce the conjugate beam are arranged so that the axis of the conjugate beam 33 is directed through aperture 50'. As is well understood, the DC term of a conjugate beam modulated by a hologram travels in the direction of the conjugate beam axis. The provision for the removal of the DC term from the optical system prevents flooding the duplicate core 35 with light which would otherwise reduce the clarity of the three-dimensional real image produced by the higher order terms of the modulated conjugate beam. Beam 46 and lens 27 of FIG. 4 are correspondingly adjusted so that the axis of reference beam 26 of FIG. 4 coincides with the offset axis of conjugate beam 33 of FIG. 5.

It should be noted that although the disclosed embodiment of the present invention achieves the transfer of a predetermined desired pattern from a master core to a duplicate core, the invention is completely applicable to the transfer of patterns between other three-dimensional objects. For example, the invention is suitable for the transfer of printed-circuit patterns from a master printed-circuit board having plated through-hole connections between circuits mounted on the opposite surfaces of the board onto duplicate apertured photosensitized boards. In any case, the invention provides for the transfer of a desired pattern from a three-dimensional master object onto duplicate three-dimensional objects using materials and processes which are completely compatible with existing photoprinting techniques.

While the invention has been particularly shown and described with reference to preferred embodiments thereof, it will be understood by those skilled in the art that the foregoing and other changes in form and details may be made therein without departing from the spirit and scope of the invention.

I claim:

1. A holographic photoprinting method comprising:

providing a three-dimensional object having a three-dimensional pattern on the accessible surfaces thereof;

illuminating every accessible surface of said object with at least one object beam of monochromatic spatially coherent light;

collecting said light reflected from every said accessible surface;

producing at least one reference beam of monochromatic spatially coherent light of the same frequency as each said object beam;

exposing photosensitive means to the collected light and to said reference beam for producing at least one hologram representing said pattern on said object;

producing at least one conjugate beam of light which is the conjugate of a respective reference beam;

each said conjugate beam illuminating a respective hologram and thereby producing a three-dimensional real image of said pattern at the location of said object; and replacing said three-dimensional object by a photosensitized object having substantially the same shape as said three-dimensional object without said pattern placed at the position of said real image whereby every accessible surface of said photosensitized object simultaneously is exposed to said real image.

2. A holographic photoprinting optical system comprising:

a hologram representing a three-dimensional pattern on the accessible surfaces of a three-dimensional object;

said hologram being produced by an object beam of monochromatic spatially coherent light reflected from said object and a reference beam of monochromatic spatially coherent light of the same frequency as said object beam;

means for producing a conjugate beam of light which is the conjugate of said reference beam;

said conjugate beam illuminating said hologram and being modulated thereby;

means for directing the modulated conjugate beam to a location where a three-dimensional real image of said pattern on said object is produced; and a photosensitized object having substantially the same shape as said three-dimensional object without said pattern placed at the position of said real image whereby every accessible surface of said photosensitized object simultaneously is exposed to said real image.

3. The system defined in claim 2 wherein said means for directing said modulated conjugate beam includes a concave mirror partially surrounding said duplicate object 4. The system defined in claim 2 wherein said hologram is flat.